Aug. 25, 1942.                G. STROBRIDGE                2,294,251
                        POWER TRANSMITTING MECHANISM
                          Filed Feb. 12, 1938      6 Sheets-Sheet 2
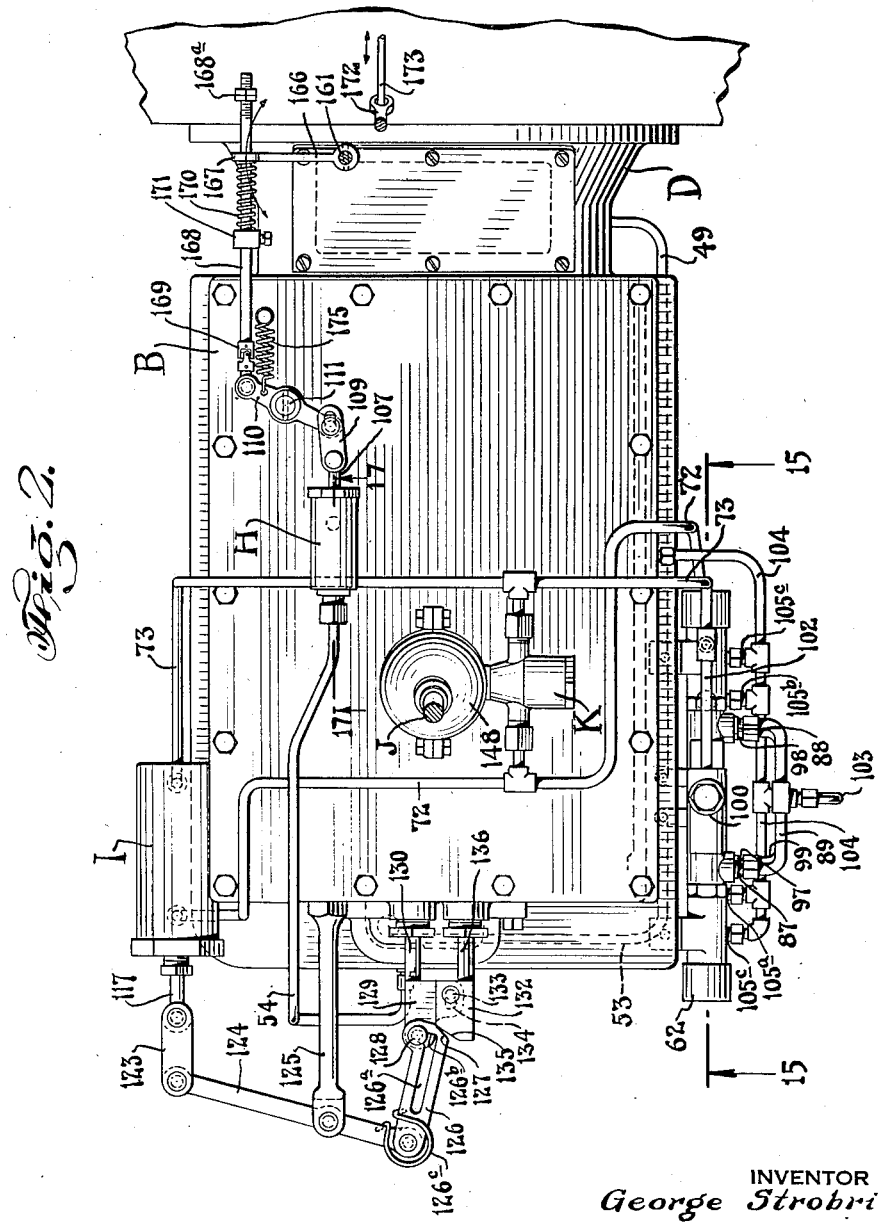
INVENTOR
George Strobridge
ATTORNEY

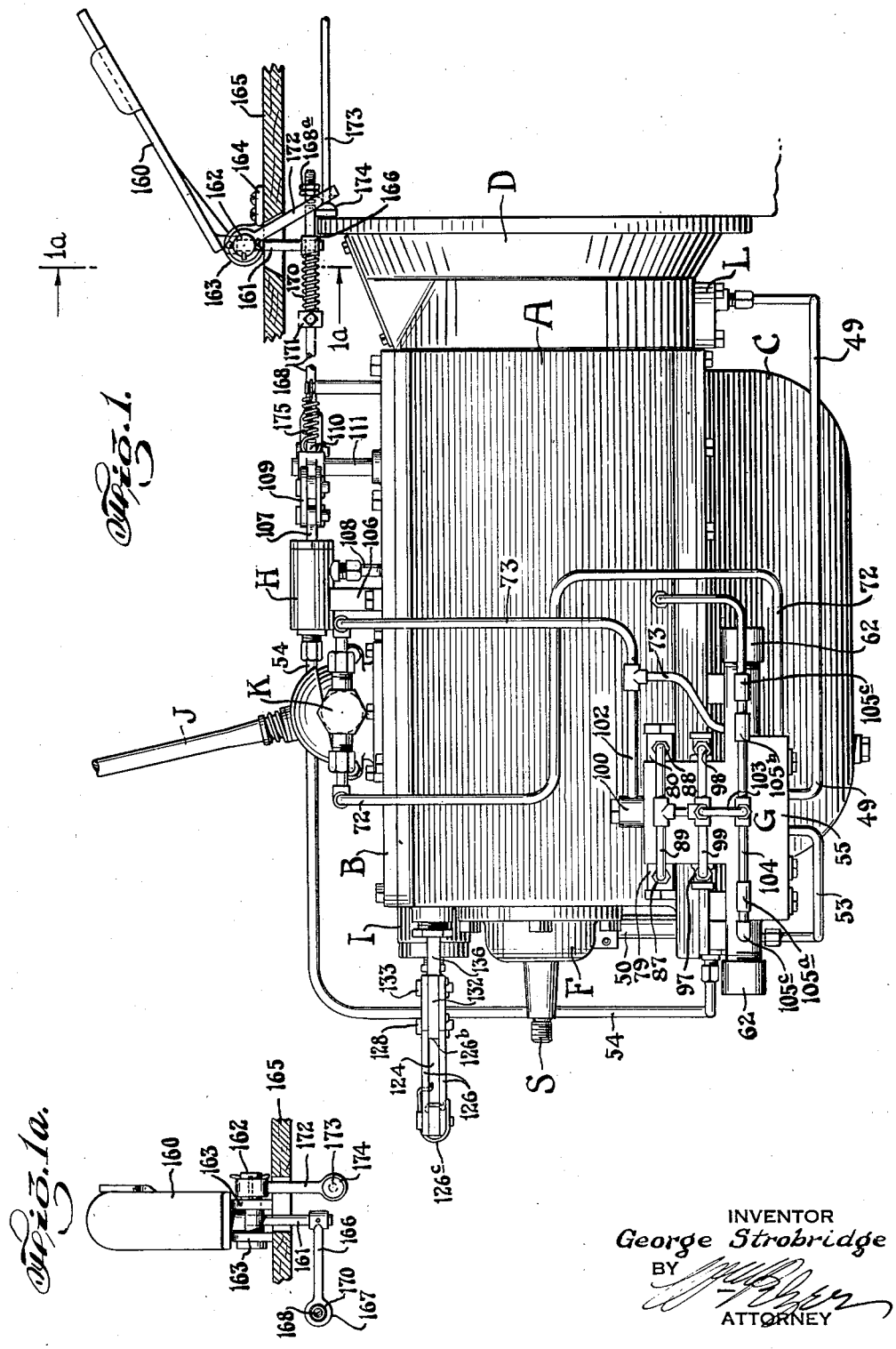

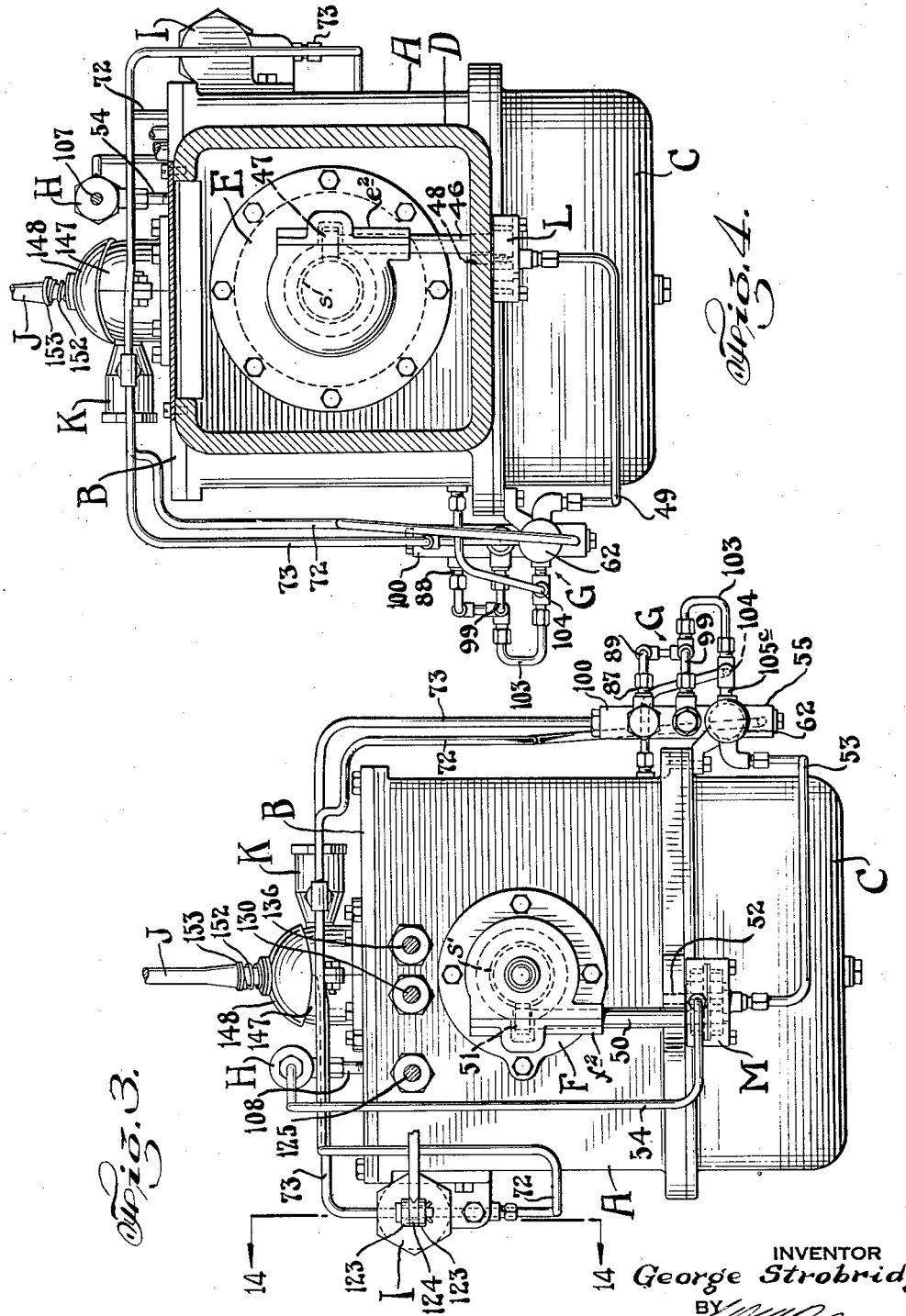

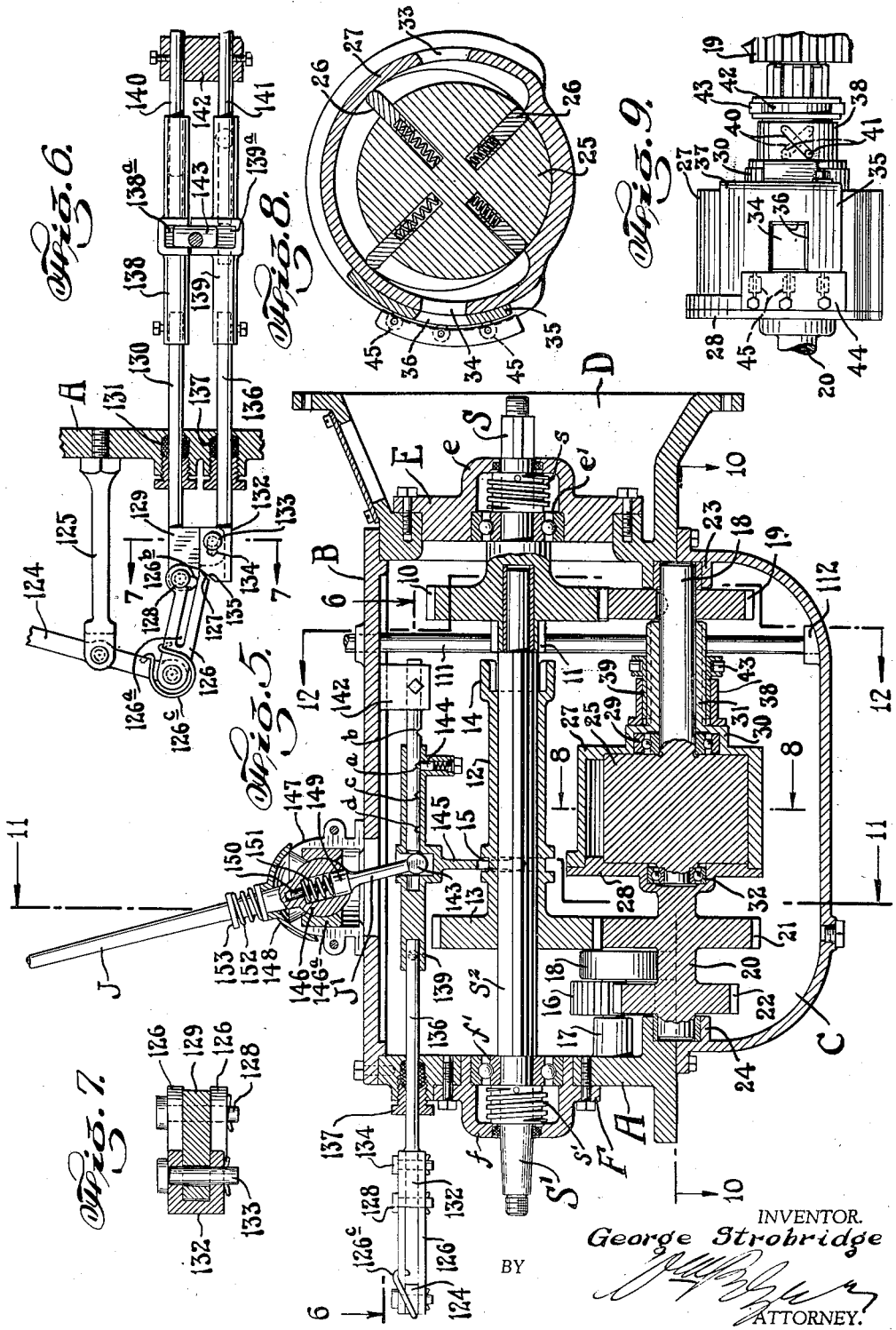

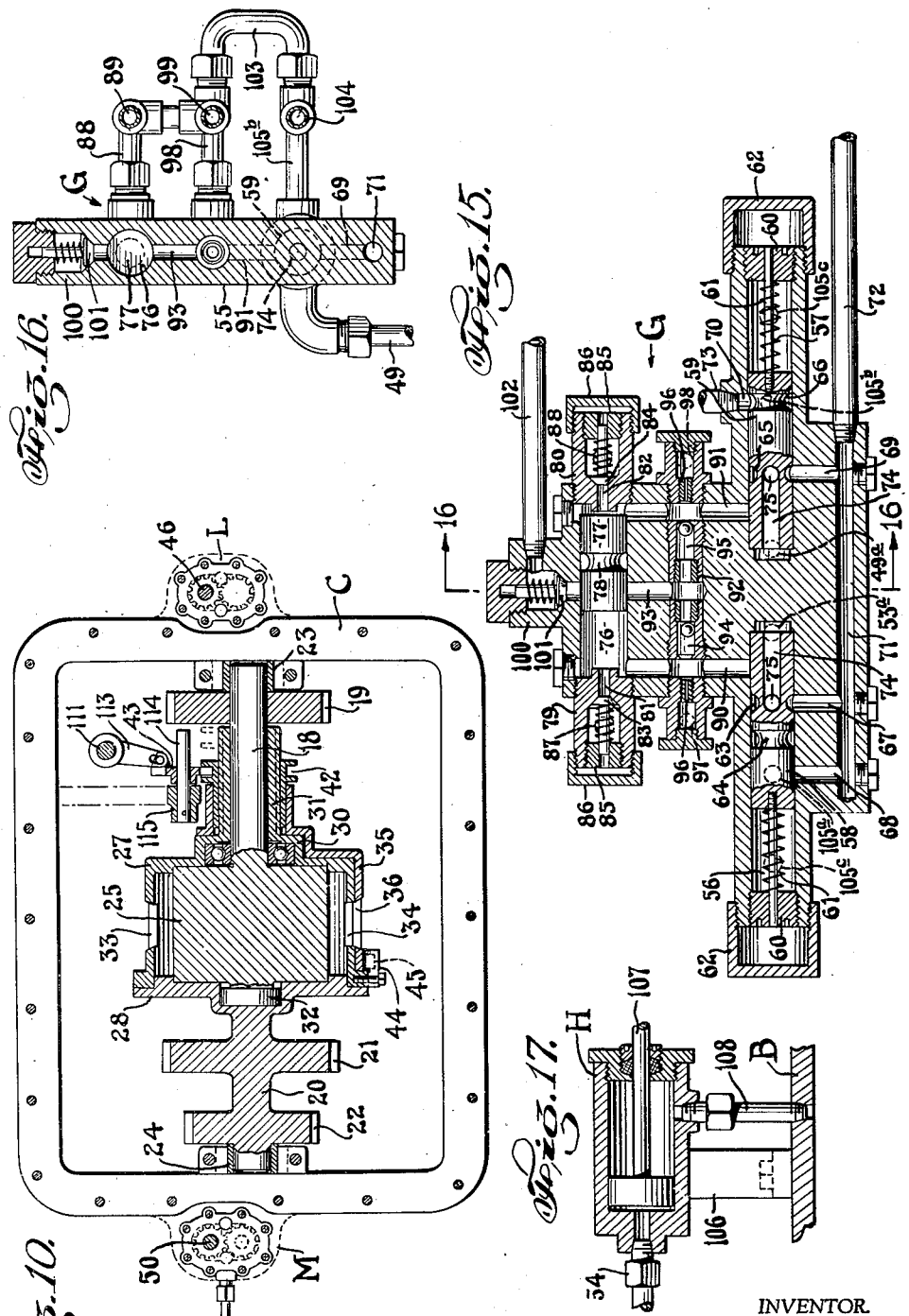

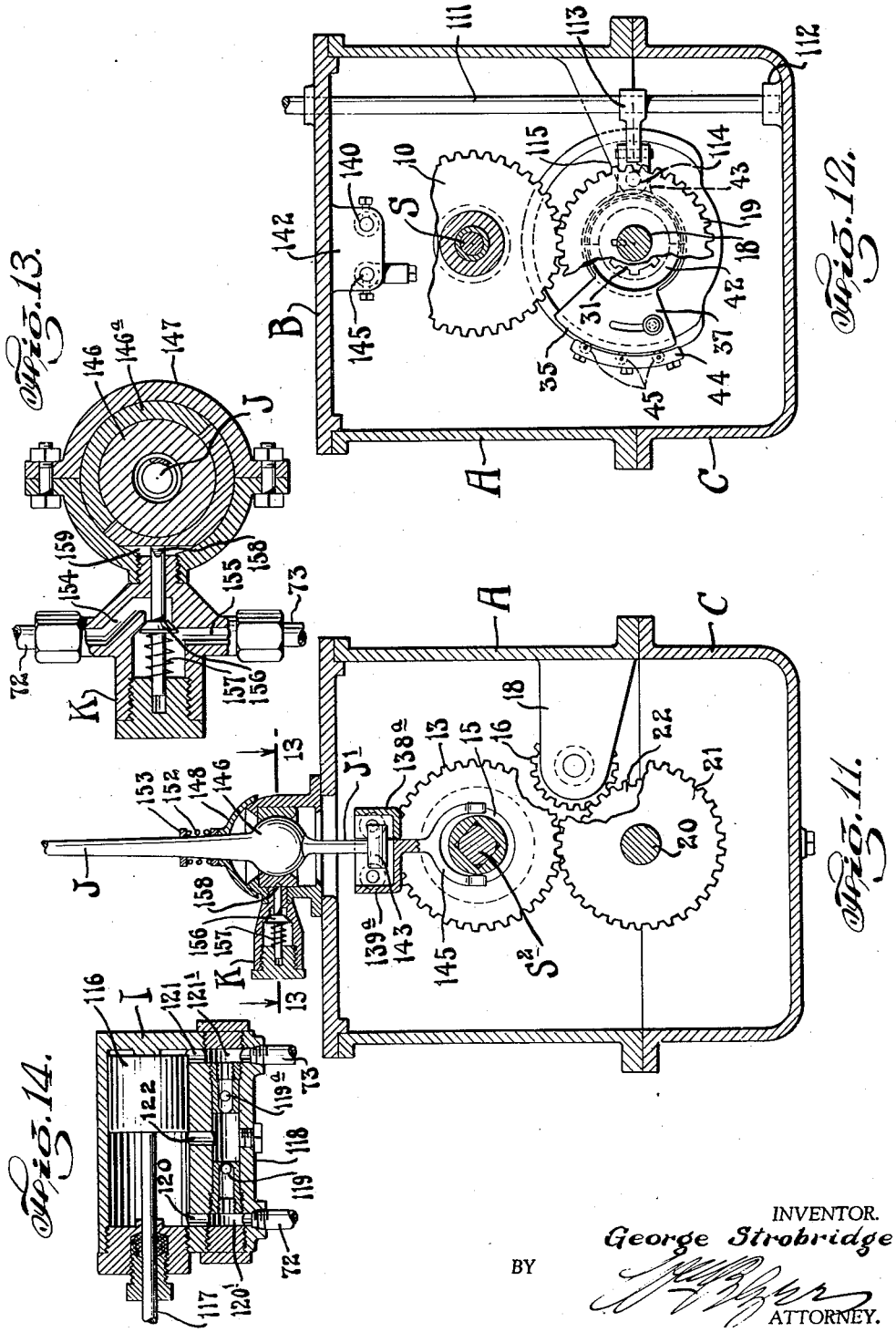

Patented Aug. 25, 1942

2,294,251

UNITED STATES PATENT OFFICE 2,294,251

POWER TRANSMITTING MECHANISM

George Strobridge, Brooklyn, N. Y., assignor of one-half to Edward Levy, New York, N. Y.

Application February 12, 1938, Serial No. 190,349

22 Claims. (Cl. 74—189.5)

My invention relates to the transmission of power from a prime mover or driving shaft to a driven shaft at variable speeds by means of a hydraulic coupling, and more particularly to power transmissions for vehicles driven by internal combustion engines.

The object of my invention generally is to provide a hydraulic coupling and means for controlling the flow of fluid whereby the speed and power transmitted may be varied automatically from a predetermined low to maximum high, or vice versa, and a manual control for starting the automatic operation, combined with means for manually controlling the neutral and reverse drive when desired.

Further objects are to provide (1) a power transmission which will dispense with the usual main driving clutch; (2) a transmission in which gear shifting for forward speeds, except for direct shaft drive, is eliminated; (3) a transmission in which the coupling of the driving and driven shafts for direct shaft drive is automatically made when the speed ratio of the driving and driven shafts reaches a predetermined high and is automatically uncoupled at a predetermined low, and in which also an overdrive or speed ratio above the direct shaft drive is obtainable at the will of the operator; (4) a transmission whereby manual shifting or control for forward speed changes may be dispensed with and in which the usual accelerator and brake controls are the only manually operated means required for normal operating conditions. Further objects are to provide a power transmission whereby the following advantages are obtained; freewheeling under all operating conditions except when in direct shaft drive; change of drive ratio at any car speed; automatic decrease in drive ratio under load; avoidance of motor stalling and permitting application of full engine power to the drive shaft when the vehicle is at rest; increase of accelerative ability; and increased gasoline mileage through use of proper power ratio and overdrive.

In the accompanying drawings my invention is illustrated as applied to a power transmission for motor driven vehicles, in which—

Figure 1 is a longitudinal elevation of the transmission casing with the automatic control means and manual control for neutral and reverse shown mounted on the casing, and the accelerator pedal for starting and maintaining the automatic operation.

Figure 1ª a front elevation of the accelerator pedal.

Figure 2 a top plan view of the transmission casing with the control means mounted thereon.

Figures 3 and 4 are, respectively, rear and front end elevations of the transmission casing.

Figure 5 a longitudinal central vertical section of the transmission.

Figure 6 a horizontal section on the line 6—6 of Figure 5 showing in plan view the shifter slides of the shifter mechanism.

Figure 7 a cross-section on the line 7—7 of Figure 6.

Figure 8 a cross-section of the hydraulic coupling on the line 8—8 of Figure 5.

Figure 9 a side elevation of the hydraulic coupling.

Figure 10 a horizontal section on the line 10—10 of Figure 5.

Figure 11 a vertical section on the line 11—11 of Figure 5.

Figure 12 a vertical section on the line 12—12 of Figure 5.

Figure 13 an enlarged horizontal cross-section on the line 13—13 of Figure 11.

Figure 14 an enlarged horizontal cross-section on the line 14—14 of Figure 3.

Figure 15 an enlarged vertical longitudinal section on the line 15—15 of Figure 2.

Figure 16 a vertical cross-section on the line 16—16 of Figure 15, and

Figure 17 an enlarged horizontal section on the line 17—17 of Figure 2.

Referring to the drawings and more particularly to Figures 1 to 4, the transmission casing is shown as composed of body A, cover B, bottom or sump C, flanged extension D having bolt holes for securing the forward end of the casing to the engine casing or chassis of the vehicle, forward bearing head E for drive shaft S, and rear bearing head F for driven shaft S'.

Referring now to Figure 5, which shows the transmission in vertical central section, it will be seen that heads E and F are formed with hubs e and f, respectively, which are centrally bored in axial alignment for the shafts S and S', respectively, and which hubs are grooved to receive a packing material. At the inner side the hubs are bored to receive ball-bearings e' and f' for the shafts S and S', respectively. The hubs e and f are of a depth to house worm-sleeves s and s' secured on shafts S and S', respectively, between the walls of the hubs and the ball-bearings. The outer surfaces of the hubs are extended at one side of the axial centers as seen in Figures 3 and 4 to form with the cap-plates $e^2$ and $f^2$ vertical bearings for pump shafts hereinafter referred to. The inner end of shaft S is provided with gear wheel 10 which may be formed integrally with the shaft as illustrated in Figure 5, or may be a separate member having a hub keyed to the shaft to rotate directly therewith. The inner end of shaft S, or the hub or gear wheel 10, is bored to receive and serve as a bearing for the reduced inner end of shaft S'. The inner end of the hub of gear 10 is splined on its outer periphery as shown at 11 to form the male member of a spline clutch for direct shaft drive. Between this clutch member 11 and the ball-bearing $f'$, shaft S' is square as indicated at $s^2$, and on this section of the shaft is a sleeve 12 having at one end gear wheel 13 and at the opposite end the female member 14 of the direct drive clutch. An enlargement on the sleeve is grooved as shown at 15 to receive the fork of a shifter-arm hereinafter referred to. As shown in Figure 5, sleeve 12 is in position for geared drive connection. A shift to the right disengages gear wheel 13 and interlocks clutch members 11—14 for direct shaft drive, and a shift to the left from the position shown disengages the geared drive to place the transmission in neutral, and a further shift to the left slides gear 13 into mesh with reversing gear wheel 16. The shaft for gear wheel 16 is journalled in bearing 17 projecting from the end wall of casing body A, as seen in Figure 5, and bearing 17' projecting from the side wall as seen in Figure 11.

In parallel alignment with shafts S and S' is a sectional counter-shaft comprising drive end 18 having gear wheel 19 keyed thereon and which is permanently in mesh with drive gear 10; driven end 20 having gear wheels 21 and 22, which may be formed integrally with the shaft as shown, or may be separate gears keyed to the shaft; and a hydraulic coupling. This counter-shaft is journalled in bearings 23 and 24 formed between the flanges of the lower rim of body A and upper rim of sump C. This arrangement permits of complete assembly of the counter-shaft for placement in position as seen in Figure 5 before securing the bottom or sump C in position. Gear 21 is adapted to mesh with gear 13 and gear 22 is permanently in mesh with reversing gear 16. The geared relation between drive shaft S and the hydraulic coupling shaft and between that shaft and the driven shaft S' may be of any desired ratio, but in order to obtain overdrive of the driven shaft, and also to accelerate the automatic functioning of the hydraulic coupling, I prefer to provide gears 10 and 19 having, for instance, a ratio of 10 to 8 which would produce a twenty-five percent overdrive of the driven shaft S' when the hydraulic coupling is operating at maximum transmission.

The hydraulic coupling may be of any suitable type, but as illustrated in Figures 5 and 8 is in the form of a rotary pump having a rotor 25 provided with radial slots for a series of radially reciprocating blades 26 rotating counter clockwise in a casing composed of cylindrical member 27 and head 28. The body of rotor 25 is shown in Figure 5 as formed integral with shaft 18 and provided with a journal having a ball bearing 29 seated in a hub 30 formed on casing 27. The head 28, shaft section 20 and gears 21 and 22 are shown as formed in one piece, but it will be understood that the head and gears may be formed separately and keyed to a shaft. The hub of the cylindrical member 27 is extended into a sleeve 31 extending to the gear wheel 19, and which sleeve with ball bearing 29 and ball bearing 32 seated in the hub of head 28 carry the rotor 25 and maintain the coupling members in alignment. The casing head 28 is machined to form a close fitting liquid tight seat for the flanged rim of cylindrical member 27 and the two members are rigidly secured together at the seat in any suitable manner so that the casing with its sleeve 31, shaft 20 and gears 21—22 will rotate together as a unit, and shaft 18, rotor 25 and gear 19 will rotate together as a unit. The casing 27 is provided with port holes 33 and 34, the former being permanently open, and the latter being provided with a sliding gate valve 35 having a port 36. The sliding gate is shown in the form of an arcuate plate having a close sliding fit on the periphery of casing 27 and projects from a wing 37 extending from a sleeve 38, Figure 9, rotatively mounted on a sleeve 39 which is internally splined to slide on the splines of a casing sleeve 31 as seen in Figures 5, 9 and 10. The sleeve 38 of the slide valve 35 has diagonal slots 40 cut through at opposite sides, Figure 9, and working in these slots are a pair of pins 41 projecting from sleeve 39, and this sleeve is provided with an annular groove 42 with which the arms of a shifter-fork 43 engage to slide sleeve 39 on casing sleeve 31. As sleeve 39 is shifted back and forth pins 41 will cause sleeve 38 to rotate on sleeve 39 and cause slide valve 35 to slide on casing 27, thereby regulating the port 34 from complete opening to complete closure. To hold the slide valve in close contact with the casing a guide plate 44 having rollers 45 is bolted to the casing to overlap the free end of the slide valve as seen in Figures 8, 9 and 10. When in use the transmission casing is supplied with sufficient oil to submerge the hydraulic coupling so that port 33 will at all times admit oil to the rotor, and the position of the slide valve 35 will determine the rate of ejection from the coupling casing by the blades of the rotor.

Mounted on the transmission casing, see Figures 1 to 4, are the automatic oil control center G, the power ratio control cylinder H, the automatic gear shift cylinder I, the hand gear shift lever J and its valve K, and the oil pumps L and M. These parts are all preferably mounted directly upon the transmission casing, although all but the oil pumps might be mounted independently of the casing.

The oil pump L, Figures 4 and 10, is mounted at the forward end of the transmission casing at the underside of extension D and may be of any suitable type, such as a gear pump, driven by shaft 46 and worm-wheel 47 which meshes with worm $s$ on the drive shaft S. The oil feed to this pump is through a duct 48 leading to the interior of the transmission casing and is fed by the pump through pipe 49 to the automatic oil control center G hereinafter referred to in detail. This pump it will be observed is driven continuously in the same direction through its connection with drive shaft S.

The oil pump M, Figures 3 and 10, is mounted at the rear end of the transmission casing and is secured to the flange of casing body A. This pump has a double set of gears divided by a partition in the pump casing and thus constitutes two pumps driven at the same speed by pump shaft 50 and worm-wheel 51 which meshes with worm $s'$ on the driven shaft S'. Instead of the double gear pump M two separate pumps may be employed. The oil feed to this double pump is through a duct 52, Figure 3, leading from the interior of the transmission casing and is fed by pipe 53 from the lower section of the pump to the automatic oil control center G and by pipe 54 from the upper section of the pump to the power ratio control cylinder H which under certain conditions as hereinafter explained operates the shifter fork 43 to shift slide valve 35 of the hydraulic coupling. Pump L and the section of pump M which delivers oil to the oil control center through pipe 53 are of the same capacity so that when the shaft speeds of S and S' synchronize the pumps will deliver oil at equal pressures to the oil control center G.

The automatic oil control center G for the oil feed is illustrated in detail in Figures 15 and 16. The body of this device as illustrated is in the form of a single block 55 drilled to provide piston chambers and ducts, and is preferably mounted on the side of the transmission casing as shown in Figure 1. In Figure 15, the block 55 is shown as having two laterally projecting sections which are drilled to form valve chambers 56 and 57 for the piston slide valves 58 and 59. These valves are preferably in the form of cylindrical pistons having stems which slide in plugs 60 screwed into the outer ends of the piston chambers. Between the slide valves and the plugs are coiled springs 61 sleeved on the valve stems and which serve to drive the valves to the extreme forward or inward positions against the shoulders at the inner ends of the chambers as shown in Figure 15, and the function of the screw plugs 60 is to adjust and equalize the pressure of springs 61. To protect the ends of the valve stems, and to serve as adjustable stops for the valves, the valve chambers are provided with screw caps 62. The piston valves 58 and 59 are provided with circumferential grooves 63—64 and 65—66, respectively, which register with oil ducts 67—68 and 69—70, respectively, in the idle or starting position of the valves, as shown in Figure 15. Ducts 67, 68 and 69 connect with oil duct 71 to which pipe 72 is connected and which pipe conveys the oil directly to the rear end of automatic gear shift cylinder I, Figures 2 and 14, hereinafter referred to in detail. From the forward end of cylinder I pipe 73 returns the oil to port 70. Valve pistons 58 and 59 are drilled to form ducts 74 and are perforated as indicated at 75 to provide communication from the piston valve chambers to the piston grooves 63 and 65, and through them with ducts 67 and 69, respectively. Piston grooves 63—64 on piston 58 are so located that when the piston 58 is in its extreme forward position as in Figure 15, groove 63 will register with duct 67, groove 64 will be out of register, and the piston will close duct 68, and when the piston 58 is moved backward against its spring pressure and arrested by its stem contacting with cap 62, the groove 64 will register with duct 68 and the return port 105ª, groove 63 will be out of register, and the piston will close duct 67. Piston grooves 65—66 on piston 59 are so located that when the piston is in its extreme forward position, as in Figure 15, groove 65 will register with duct 69 and groove 66 will register with ports 70 and 105ᵇ, and when moved against its spring and arrested by its cap 62, the piston will close duct 69 and ports 70 and 105ᵇ. The upper end of block 55 is bored to form cylindrical valve chamber 76 in which piston slide valve 77 provided with a central circumferential groove 78 is adapted to slide freely. The ends of valve chamber 76 are closed by screw-threaded plugs 79 and 80 having ports 81 and 82, respectively, communicating with valve chambers within the plugs, and which ports are normally closed by spring seated valves 83 and 84, respectively. These valves have stems which slide in screw-threaded plugs 85 which are adjustable to regulate the pressure of the valve springs. The outer ends of valve plugs 79—80 are provided with caps 86 which protect and serve as stops for the valve stems. Valve plugs 79—80 have relief ports 87 and 88, respectively, which are connected together by pipe 89, Figures 1 and 16. Extending vertically in block 55 are two ducts 90 and 91 which pass through a central horizontal passage 92 and which ducts connect valve chamber 76 at both ends with valve chambers 56 and 57, respectively, but which ducts are closed by piston valves 58 and 59, respectively, when the pistons are in the forward position as shown in Figure 15. Extending vertically at the center of block 55 is a duct 93 which connects valve chamber 76 with the central passage 92 midway between ducts 90 and 91. Screwed into the central passage 92 are two ball check valves 94 and 95 having ports which open into passage 92 for communication with duct 93, and circumferential ported grooves which communicate with ducts 90—91. The check valves are provided with small relief ports 96 which communicate with relief ports 97 and 98 which are connected together by pipe 99, Figures 1 and 16. At the top center of block 55 is a valve chamber 100 having a port in alignment with the duct 93, and which port is normally closed by a spring seated valve 101. Valve chamber 100 has a port to which pipe 102 is connected, and which pipe is coupled to pipe 73 leading from the gear shift cylinder I, Figures 2 and 14. Pipe 89 which is connected between relief ports 87—88 has a coupling which connects with pipe 99 which is connected between relief ports 97—98, and both pipes 89 and 99 are connected by pipe 103 to oil return pipe 104 which is connected to the transmission casing as seen in Figure 1. The return pipe 104 is connected to the piston valve chambers 56 and 57 by return port couplings 105ª and 105ᵇ, respectively, and by relief port couplings 105ᶜ at the rear of piston valves 58 and 59 as seen in Figure 1.

The power ratio control cylinder H, Figures 1, 2 and 17, is preferably mounted directly upon the upperside of the transmission casing, and comprises a cylinder horizontally supported as by bracket 106 secured to cover B of the casing; a piston and piston rod 107; an oil inlet at the rear end of the cylinder to which oil pipe 54 is connected so that the oil pressure will tend to drive the piston rod forward, and an outlet port at the forward end of the cylinder to which return pipe 108 is connected and which leads directly to the transmission casing through cover B. Piston rod 107 has pivotally connected to it a slotted link 109 which is connected to lever 110, Figure 2. This lever is rigidly secured on shifter shaft 111 journalled in the cover B and stepped in a bearing 112 on the inside of casing member C, Figure 12. Shaft 111 has rigidly secured thereon a shifter arm 113, Figures 10 and 12, having a slot through which the pin of shifter fork 43 passes to afford a sliding connection. The shifter fork slides on rod 114 extending parallel to the rotor shaft 18 and which rod projects from bracket 115 extending from the side wall of the transmission casing.

The automatic gear shift cylinder I, Figures 2 and 14, is preferably mounted on the side of the transmission casing opposite the automatic oil control center G and comprises cylinder I having a long piston 116 and piston rod 117; a valve or cut-off box 118 in the opposite ends of which ball check valves 119 and 119a are secured; oil ducts 120 and 121 which communicate with passages 120' and 121' cut through the bodies of the check valves, and with ports to which oil pipes 72 and 73 are respectively connected; and at the mid-section of the cylinder an outlet port 122 which leads directly into the cut-off box between the two check valves. The position of piston 116 when the transmission is operating with geared drive is at the forward end of cylinder I, as shown in Figure 14, and the piston will be in that position when the transmission is at rest. When the engine is started and pumps L and M begin the oil circulation, as hereinafter explained, the oil feed from the oil control center G to cylinder I will be through pipe 72 and through ducts 120' and 120 to the piston chamber to hold the piston in the forward position, and simultaneously the ball check valve 119 will be driven to its seat to prevent flow directly into the cut-off box as seen in Figure 14. The return flow from the piston chamber will be through port 122, unseating ball check valve 119a and opening the outlet through the check valve, and passage 121' to pipe 73 which leads back to the oil control center G at 73, Figure 15. Piston rod 117 is connected by hinged link 123, Figure 2, with shifter lever 124 pivoted on a post 125 projecting from the rear end of the transmission casing. To the short end of lever 124, Figures 2 and 6, is hinged a link 126, U-shaped in cross-section, having a pair of long slots 126a terminating in a pair of short slots 126b projecting approximately at a right angle thereto, and bevelled shoulders or cam surfaces 127. Link 126 is connected by pin 128 passing through its slots with a block 129 rigidly attached to a slide rod 130 sliding through a packed bearing 131 in the rear wall of casing A, Figure 6. The slotted link 126 is held under spring tension by a spring 126c which is hooked between the link and lever 124, so that connecting pin 128 will normally be held seated between the shoulders formed by the short angle 126b of the slots to impart the fore and aft movements of piston 116 to the slide rod 130. Slidably connected with block 129 is a block 132, U-shaped in cross-section as seen in Figure 7, having a pin 133 which passes through slot 134 in block 129, Figures 6 and 7, and having bevelled shoulders or cam surfaces 135 which engage cam surfaces 127 on link 126. Block 132 is rigidly attached to a slide rod 136 sliding through a packed bearing 137 similar to bearing 131 and which rod is parallel with and in the same horizontal plane as rod 130. Rods 130 and 136 are adjustably secured to a pair of slides 138 and 139, Figures 5 and 6, which are bored to slide on rods 140 and 141 adjustably secured in lug 142 projecting from cover B of the transmission casing. Slides 138 and 139 at the mid-section are provided with sockets 138a and 139a extending crosswise of the slides and open at the top and adjacent ends, the former being shorter than the latter, see Figure 11, and in which sockets a cross-head 143 on hand gear shift lever J is adapted to slide. The length of the cross-head is such that when the lever J, hereinafter referred to in detail, is in a central position as in Figures 6 and 11, or as far as the cross-head will shift into the socket 138a, it will interlock the slides 138 and 139, so that the slides may be moved in unison by the operating lever, or both slides caused to respond in unison to the fore and aft movements of piston 116. When the lever J is swung to the right as viewed in Figure 11 the cross-head will seat entirely within socket 139a and permit the shifting of slide 139 independently of slide 138 for neutral and reverse drive positions, and simultaneously cause cams 127 and 135 to shift link 126 against the tension of spring 126c and place pin 128 in the long slot 126a, and thereby operatively disconnecting shifter lever 124 from the shifter slides 138 and 139 and permit free movement of slides 139 without retardation by the pressure in cylinder I. Slide 139 is provided with a socket in which is seated a spring pressed detent 144, Figure 5, adapted to engage notches *a*, *b*, *c* and *d* on rod 141 to position and hold the shifter slides; notch *a* being the forward geared drive position, notch *b* the direct shaft drive position, notch *c* the neutral or idle position, and notch *d* the reverse drive position. Slide 139 has projecting downward from socket 139a forked arm 145 which engages the shifter groove 15 on sleeve 12 and whereby the fore and aft movements of slides 138 and 139 in unison, or slide 139 alone, shifts the sleeve 12. In the position shown in Figures 5 and 6, the detent is in notch *a* and gears 13—21 in mesh for forward geared drive. Through the forward movement of the slides to the position where the detent engages notch *b* the shifter fork will move sleeve 12 forward to disengage gears 13—21 and interlock clutch members 11—14 for direct shaft drive, and by rearward movement of the slides to the point where the detent engages notch *c* the sleeve will shift to disengage gears 13—21 and hold the transmission in the neutral or inoperative position, and further rearward movement of the slides to the point where the detent engages notch *d* sleeve 12 will move gear 21 into mesh with gear 16 for reverse drive. It will be noted by reference to Figure 6 that slide rods 140 and 141 are of unequal length, and that slide 139 is bored through beyond socket 139a to afford clearance for rod 141 when slides 138—139 are shifted forward to interlock the direct shaft drive clutch members 11—14. Rod 141 is of such length that when the slides 138—139 are in the position shown in Figures 5 and 6 for the geared drive connection, it will project into the slide so as to be flush with the inner surface of socket 139a so that when the hand lever J is in the central position as in Figure 11, the slides will be free to move in unison, and when tilted to shift cross-head 143 further into socket 139a the cross-head will engage the end of rod 141 and lock the slides against shifting forward and prevent the shift of sleeve 12 for direct shaft drive connection. When the transmission is in direct shaft drive the cross-head 143 will contact the slide rod 141 and prevent the tilting of the hand lever J laterally, and change of drive through the operation of the hand lever J can only be obtained by depressing the lever to open the relief valve K to relieve the pressure on the piston of shifter cylinder I, whereupon the shifter sleeve 12 may be shifted by the hand lever to the geared drive, neutral or reverse drive positions.

From the foregoing description of the connection of hand lever J with the shifter slides, it will be observed that the lever has four functions: (1) To shift the transmission into the neutral position; (2) to shift the transmission into reverse drive; (3) to provide manual shift into direct shaft drive or into geared forward drive when desired; and (4) to lock the transmission against automatic shift into direct shaft drive and hold the transmission in the overdrive connection.

The hand gear shift lever J, Figures 5 and 11, is pivoted by a ball and socket joint 146—146ᵃ in a housing 147 secured on cover B, and which housing is spherical at the top and closed by a spring pressed cap 148. Lever J is preferably in two sections, see Figure 5, the upper section having ball 146 at its lower end and the lower section J' having the crosshead 143 at its lower end and a cylindrical shoulder 149 and shank 150 at its upper end, the shoulder and shank sliding in a socket in the ball 146 and held in the extended position by coiled spring 151. The socket 146ᵃ is adapted to slide vertically within housing 147 by downward pressure on lever J, the lever in this movement sliding through cap 148 against the pressure of coiled spring 152 which is seated between the cap 148 and fixed collar 153 on lever J. By reference to Figure 5 it will be observed that when lever J is pressed downward, lever section J' is free to slide upward within the ball 146 against its spring, and socket 146ᵃ will slide downward in the housing with the lever J, and when the pressure on lever J is discontinued spring 152 will move the lever and socket upward to the position of Figures 5 and 11.

The hand gear shift lever J has co-operating with it the valve K shown in detail in Figures 11 and 13. This valve comprises a casing mounted on the housing 147 and having ports 154 and 155 to which oil pipes 72 and 73 are respectively connected as shown in Figure 2, and which ports lead to the valve chamber in which valve 156 working against the pressure of spring 157 controls communication between said ports, see Figure 13. The forward end of the valve stem is bevelled as seen at 158 and engages a V-notch or groove 159 on the socket 146ᵃ of the ball and socket joint of lever J, whereby, when lever J is depressed to shift the socket in its housing as above described, the downward movement of the socket will force the valve stem backward to open the valve 156 against its spring pressure, and when the lever is released and its spring 152 moves the lever upward, and with it socket 146ᵃ, the valve stem re-enters notch 159 allowing the spring 157 to close the valve. The function of valve 156 and the cross-connection between pipes 72 and 73 is to relieve the pressure on piston 116 in the shifter cylinder and permit the hand shifting of the shifter mechanism by lever J, the piston 116 in the movement imparted by the hand lever causing the oil in cylinder I to circulate around by way of the cross connection between pipes 72 and 73 at the relief valve K. Relief of the pressure on piston 116 could be obtained by a separate manually operated valve, but the arrangement for control by the hand gear shift lever J is preferred.

The accelerator pedal for accelerating the engine and power transmission is shown in Figures 1, 1ᵃ and 2. The pedal 160 is shown as having a compound rocking movement, and for this purpose the pedal is mounted at a suitable angle on a rod 161 which passes through and is swivelled in trunnion pin 162 journalled in bearings 163 projecting from plate 164 secured upon a fixed support 165. Rod 161 projects through an opening in the support 165 and has an arm 166 rigidly secured thereon and which arm at its free end has a bevelled collar or fork 167 through which connecting rod 168 passes. The connecting rod is connected through a universal joint 169 with lever 110 on the shaft 111 which actuates the shifter fork 43 of the hydraulic coupling slide valve 35. The operative connection of the arm 166 with the connecting rod 168 is preferably yielding one and for that purpose a coiled spring 170 is sleeved on the connecting rod between the collar 167 and an adjustable collar 171 on the connecting rod, and on the opposite side of collar 167 are nuts 168ᵃ which are adjusted on the rod 168 to leave a clearance between the collar and nuts as seen in Figure 2. One end of the trunnion pin 162 projects beyond its bearing as seen in Figure 1ᵃ and keyed thereon is an arm 172 having a bevelled collar through which projects the rod 173 having a knob 174, and which rod is the usual connecting rod for operating the engine throttle. The compound rocking movement of the pedal is provided, first, for the purpose of imparting through depression of the pedal rearward movement to rod 161 and arm 172, valve rod 168, and throttle rod 173; and second, by rocking the pedal laterally, to turn pivot rod 161 in trunnion pin 162 and swing arm 166 forward to impart forward movement to valve rod 168 by engagement of collar 167 with nuts 168ᵃ. Rearward movement of rod 168 rocks lever 110 to rotate shaft 111 and rock shifter fork 43 to shift slide valve 35 towards its closed position, and forward movement of rod 168 acting with spring 175 against the oil pressure on the piston of cylinder H, under certain conditions, operates to shift valve 35 toward the open position. It will be noted that this lateral rocking movement of pedal 160 for imparting forward movement to rod 168 is independent of and imparts no movement to throttle rod 173, but if simultaneously with the lateral rocking movement the downward pressure on the pedal is decreased throttle rod 173 will move forward as usual to throttle down the engine. Lever 110 and the operating rod 168 are held under tension by spring 175 so that lever 110, shaft 111, arm 113, and shifter fork 43 tend to return to the initial or idle position indicated in Figures 2 and 10, which is the position in which slide valve 35 is held wide open and consequently the rotor of the hydraulic coupling will rotate freely without transmitting power to the driven shaft. The movement of lever 110 through the vertical rocking movement of pedal 160 is free to rotate shaft 111 for actuating the shifter for 43 independently of the power ratio control cylinder H due to the slot in link 109 which connects the piston rod 107 of cylinder H with lever 110. The purpose of this independent movement is to permit starting of power transmission through the hydraulic coupling before the control cylinder H begins to function.

As above stated, the usual main clutch between the engine shaft and drive shaft, and its operating pedal, are dispensed with, the function of such clutch being performed by the hydraulic coupling, and it will be noted that when the engine is started, drive shaft S immediately begins to rotate and with it gear wheels 18—19 and rotor 25 of the hydraulic coupling. The oil which fills the transmission casing to a point above the coupling is free to circulate through the coupling without causing rotation of the driven end since the valve 35 would at that time be wide open. This permits speeding up the engine to full speed, if desired, by depressing the accelerator pedal, and simultaneously with the depression of the pedal valve rod 168 is operated to shift fork 43 and valve 35 to decrease the oil outlet from the coupling casing 27. This starts rotation of the driven end of the coupling, rotating gear wheels 21—13 and driven shaft S', and thereby gradually applying power to the driven shaft. When the drive shafts starts rotating, pump L will start the flow of oil through pipe 49 and port 49a into the oil control center G, and when the driven shaft S' starts rotating the pump M will begin delivering oil through pipe 53 and port 53a into the oil control center and also through pipe 54 to the power ratio control cylinder H. The flow of oil to the control center from pumps L and M has no immediate effect on the piston valves 58—59 because the pressure of springs 61 upon the rear ends of the piston valves is adjusted to permit operation of these valves only when the oil pressure is raised to a predetermined pressure due to an engine speed equivalent to a given car speed, for instance, 15 M. P. H. The oil delivered to the control center G therefore flows through the ducts and ports 74—75 of the piston valves and into grooves 63—65 and through ducts 67—69—71 and pipe 72 to the automatic gear shift cylinder I, and the oil pressure will drive ball valve 119 to its seat so that the full pressure will be on piston 116 to hold it in the position of Figure 14. The oil flowing into cylinder I will return through port 122 to the cut-off chamber 118 and through the check valve 119a and pipe 73 to the control center G by way of port 70 around groove 66 of the piston valve 59 and out through the return port 105b and pipe 104 back to the transmission casing. The oil pressure in cylinder I will now hold the shifter mechanism and transmission sleeve 12 in the positions shown in Figures 5 and 6 for geared drive, and the speed of driven shaft S' will gradually increase with the increase in speed of drive shaft S plus the reduction of slip at the hydraulic coupling as the ejection of oil decreases with the gradual closing of valve 35 due to the increasing pressure in the power ratio control cylinder H from pump M. If the transmission is in the neutral position at the time of starting the engine, transmission sleeve 12 must be shifted by means of the hand gear shift lever J to establish the geared drive connection, and the oil pressure in cylinder I will then hold the transmission sleeve in that position until the pressure on the piston is reversed.

As the speed of the driven shaft S' increases, the oil pressure in cylinder H will start movement of its piston forward against the pull of its spring 175, the movement of rod 107 and link 109 first taking up the slack at the slotted connection with lever 111, and then as the pressure in the cylinder increases, the forward movement of the piston will overcome the pull of spring 175 and rotate shaft 111 to further shift fork 43 and valve 35 to further reduce the ejection of oil from the hydraulic coupling and cause more power to be transmitted and increase the speed of rotation of the driven end of the coupling and through gear wheels 21—13 increases the power delivered to and the speed of rotation of the driven shaft S'. This action occurs as the driven shaft speed increases due to the gradual increase in speed of driving shaft S from idling speed upon the initial operation of the accelerator pedal 160 and without increasing the engine speed by further depressing the accelerator pedal as usual with other types of transmissions, and continues until the piston in cylinder H reaches the limit of its forward movement, when slide valve 35 will be fully closed, and the hydraulic coupling will transmit the full power and speed of the driving shaft S. The gradual increase in speed of the driven shaft S' is quite rapid due to the rapid functioning of control cylinder H. As the speed of driving shaft S increases with the initial acceleration of the engine due to operation of the accelerator pedal, and which movement simultaneously imparts the initial movement to coupling valve 35, the increase in speed of the driven shaft relative to the driving shaft will be proportionately more rapid due to the step-up ratio of gears 10—19, and therefore as shaft S increases in speed the functioning of control cylinder H becomes proportionately more rapid due to the relatively increased speed of shaft S'. During this movement of lever 110, connecting rod 168 will slide through the collar of pedal arm 166 and cause nuts 168a to abut against collar 167 when the piston of shifter cylinder H reaches the limit of its forward movement.

As the speed of driven shaft S' increases, and while the speed of shaft S still exceeds that of S' due to slip at the hydraulic coupling and therefore before the transmission begins overdrive, the oil pressure delivered by pump M through pipe 53 also increases, and since the pressures from both pumps L and M will merge in duct 71, the pressure on the two piston valves 58—59 will equalize, but will not affect the piston valves until the pressure becomes sufficient to overcome the pressure of their springs 61. When the combined pressures from pumps L and M become sufficient to overcome the pressure of springs 61, piston valves 58—59 will begin to shift from the position shown in Figure 15 and cut off communication at the ducts 67—69. This blocks the flow from pipes 49 and 53 to pipe 72 and builds up the pressure on pistons 58—59 and shifts them against the increased pressure of springs 61 to the extreme outward positions from that of Figure 15 where groove 64 of piston 58 will register with duct 68 and return port 105a, and the piston 59 will close duct 69 and ports 70 and 105b. The flow of oil through ducts 74—75—71 and pipe 72 to cylinder I is now cut off, thereby relieving the pressure on the rear side of piston 116, but the piston will remain in the forward position since there is at this time no reverse pressure, and slides 138—139 and sleeve 12 will likewise remain in the position shown in Figure 5. The movement of piston valves 58—59 to the extreme outward position opens ducts 90—91 and the oil entering the piston chambers from pipes 49 and 53 will now flow through ducts 90—91 to chamber 76 where the oil pressures from pumps L and M will act independently upon opposite ends of the slide valve 77. The pressures delivered through ducts 90—91 to chamber 76 at this time will be unequal since the speeds of shafts S and S' are not in synchronism and hence the oil pressure from pump L will exceed that from pump M, and consequently the pressure in duct 91 will exceed the pressure in duct 90. The oil pressure in ducts 90 and 91 will open both check valves 94 and 95 to admit oil to passage 92 and duct 93, and since the pressure in duct 91 will be somewhat greater than in duct 90, valve 77 will start moving toward the central position in chamber 76. During this movement the pressure from pump M is rapidly increasing due to the increasing speed of driven shaft S' and as the valve 77 reaches the central position oil from passage 93 will flow around groove 78 and open valve 101. This reduces the pressure on valve 77 from port 91, and since the pressure in port 90 is still increasing with the increasing speed of shaft S' the pressure on valve 77 becomes balanced as the speed of shafts S and S' synchronize and will maintain the valve in the central position. This occurs when the hydraulic coupling is about to begin overdrive through geared connections 10—19 and 21—13. The oil from ducts 90—91 will now be free to flow through both check valves 94—95 and up through duct 93 applying pressure on valve 101 and open it against the pressure of its spring. The flow of oil will then be through valve chamber 100, pipe 102 and pipe 73 to shifter cylinder I. The pressure on the rear side of piston 116 from pipe 72 having been cut off by the shift of piston valves 58—59, the oil pressure will now be on the front side of the piston 116 and cause it to move to the opposite end of the cylinder from that shown in Figure 14, and at the same time the ball check 119ª will shift to check the escape of oil for the moment into the cut-off chamber. As the piston shifts, the oil in the left end of cylinder I is driven out through pipe 72 and as the piston 116 passes the central port 122 the oil entering through pipe 73 and port 121 will escape through port 122 and unseat check valve 119 and return to the oil control center G by way of pipe 72. The oil returning to the oil control center through pipe 72 enters ducts 71—68, passes around groove 64 of piston valve 58 and through return port 105ª and pipe 104 back to the transmission casing as seen in Figure 1. Thus the co-operation of valves 77 and 101 acts as a reversing valve for cylinder I to reverse the pressure on piston 116, and this action reverses the action of lever 124 and through the shoulder formed by short slot 126ᵇ in link 126 pushes slides 138—139 in the opposite direction from that of the initial movement above described, and shifts fork 145 and thereby sleeve 12 to the right from the position shown in Figure 5, and causing clutch members 11—14 to engage for direct shaft drive; the detent 144 engaging notch b on rod 141 to retain slides 138—139 in the direct shaft drive position. This reversing action effected by the oil control center G and the shifter cylinder I is quite rapid, and the time interval between the beginning of power transmission and the synchronization of the speeds of shafts S and S' to effect the shift into direct shaft drive may be varied by the operation of the accelerator pedal to vary the speed of the engine. The shift into direct shaft drive will be maintained so long as the reverse pressure is maintained on piston 116 by the balanced pressure on slide valve 77.

To shift the transmission from direct shaft drive into geared drive, the operator will relax the pressure on the accelerator pedal to permit accelerator rod 173 to retract thereby decelerating the engine and causing a reduction in the speed of rotation of drive shaft S and a proportionate reduction in the speed of rotation of the driven shaft S'. This reduces the speed of pumps L and M in like proportion and effects a reduction of oil pressure at the oil control center G where the equal and reduced pressures on the piston valves 58—59 are overcome by the piston valve springs 61 which thereupon begin to shift the valves toward the position of Figure 15, cutting off the flow of oil from ports 49ª and 53ª to ducts 91 and 90, respectively, and consequently cutting off the pressure on valve 101 by way of duct 93 thereby allowing the spring to close valve 101 and cut off the pressure delivered through pipes 102 and 73 to the forward side of piston 116 through which the transmission was shifted into direct drive, and at the same time cutting off the return flow from pipe 72 and ducts 71 and 68 and return port 105ª and pipe 104. As the pressure at the oil control center continues to reduce, the piston valves 58—59 return to the position of Figure 15 and re-establish the oil flow from ports 49ª and 53ª through piston ducts 75, grooves 63—65, ducts 67—69 to duct 71 and pipe 72, and groove 66 of piston 59 will re-establish communication between pipe 73, port 70 and return port 105ᵇ to return pipe 104. This reverses the action and the oil pressure will now be on the rear side of piston 116 to impart a forward stroke thereto and return the sleeve 12 to the position of Figure 5 to re-establish the geared drive. This change will take place when the shaft speeds have been reduced to produce a car speed, for instance, of 15 M. P. H. The relative speeds of shafts S and S' and the rate of power transmission will now depend upon the engine speed as controlled by the accelerator pedal.

If the operator desires to shift the transmission manually from direct shaft drive into geared drive, or from geared drive into direct shaft drive, without waiting for the automatic shift above described, he may do so at will by operating the hand gear shift lever J. For this purpose the lever J is depressed to open valve 156 and the cross-connection between pipes 72—73, Figure 13, thereby relieving the oil pressure on the piston of shifter cylinder I, and simultaneously with this movement the lever is tilted to shift the shifter slides in unison in either direction.

To place the transmission sleeve 12 in the neutral position or to shift the sleeve into the reverse drive position when the transmission is in the geared forward drive position, the hand gear shift lever J is tilted to shift the cross-head 143 fully within socket 139ª whereby as above described the shifter slide 139 may be moved independently of the automatic shifter mechanism. To return the transmission from reverse drive back to geared forward drive the hand lever J is tilted back again to the normal position of Figure 5 and tilted laterally to shift the cross-head 143 into interlocking position in sockets 138ª and 139ª. If the transmission is in neutral, lever J is shifted to re-establish the normal operative position of Figure 5 as the engine is started.

From the foregoing description of the hydraulic power transmission, it will be observed that by the use of the hydraulic coupling, no main driving clutch as heretofore employed is required, and that gear shifting for speeds between minimum low and maximum high is unnecessary unless it is desired to operate on direct shaft drive, and consequently the usual clutch pedal and gear shift lever are unnecessary, and that the driving control is obtained solely through the operation of the accelerator pedal. That a transmission is provided in which the change in speed of the driven shaft and shift into and out of direct shaft drive is automatically effected without manual operation of controls other than the usual pedal for the engine control. That power transmission is due to the rate of liquid ejection at the hydraulic coupling, and that changes in speed ratio between the driving and driven shafts from zero to maximum at any car speed may be obtained in fine gradations due to the control of the hydraulic coupling valve. That free-wheeling may be had by manipulation of the accelerator pedal to effect the full opening of the hydraulic coupling valve to discontinue power transmission from the driving shaft. That change in drive ratio may be obtained at any speed since gear shifting is obviated except when shifting into direct shaft drive. And that due to the flexible connection between the driving and driven shafts at the hydraulic coupling stalling of the engine is avoided, and application of full engine power is therefore permissible under all road conditions or when the car is at a standstill.

What I claim is:

1. In apparatus of the class described, the combination with the driving and driven shafts of a power transmission, of a sectional counter-shaft, an hydraulic coupling in said counter-shaft, geared driving connections between said shafts and counter-shaft of constant ratio, a reservoir for supplying liquid to said coupling, a mechanical connection with the engine accelerator for starting power transmission through said coupling, and means functioning through the speed of the driven shaft for controlling the flow of liquid through said coupling to vary the speed of the driven shaft.

2. In apparatus of the class described, the combination with the driving and driven shafts of a power transmission, of a sectional counter-shaft, an hydraulic coupling in said counter-shaft, geared driving connections between said shafts and counter-shaft of constant ratio, a reservoir for supplying liquid to said coupling, hydraulic means responsive to the speed of the driven shaft for varying the liquid flow through said coupling to vary the speed of the driven shaft, and manually operated means for starting the functioning of said hydraulic means.

3. In apparatus of the class described, the combination with the driving and driven shafts of a power transmission, of a sectional counter-shaft, an hydraulic coupling in said counter-shaft, geared driving connections between said shafts and counter-shaft of constant ratio, a reservoir for supplying liquid to said coupling, a valve for controlling the liquid flow through said coupling, and an hydraulic device the pressure in which is responsive to the speed of the driven shaft and operatively connected with said valve for varying the rate of liquid flow through the coupling to vary the speed of the driven shaft.

4. In apparatus of the class described, the combination with the driving and driven shafts of a power transmission, of a sectional counter-shaft, an hydraulic coupling in said counter-shaft, geared driving connections between said shafts and counter-shaft of constant ratio, a reservoir for supplying liquid to said coupling, a valve for controlling the liquid flow through said coupling, a mechanical connection between the engine accelerator and said valve for starting power transmission through said coupling, and an hydraulic device the pressure in which is responsive to the speed of the driven shaft and operatively connected with said valve for varying the rate of liquid flow through the coupling to vary the speed of the driven shaft.

5. In apparatus of the class described, the combination with the driving and driven shafts of a power transmission, of a sectional counter-shaft, an hydraulic coupling in said counter-shaft, geared driving connections between said shafts and counter-shaft of constant ratio, a reservoir for supplying liquid to said coupling, a pump operated from the driven shaft of the transmission, an hydraulic device supplied with liquid by said pump from said reservoir, a valve for controlling the liquid flow through said coupling, and an operative connection between said valve and said hydraulic device whereby the rate of liquid flow through the coupling is varied.

6. In apparatus of the class described, the combination with the driving and driven shafts of a power transmission, of a counter-shaft for geared driving connection between said shafts, an hydraulic coupling in said counter-shaft, coupling members for direct shaft drive connection between said driving and driven shafts, mechanism for shifting said coupling members into and out of engagement, a fluid pressure device for actuating said mechanism, and control means responsive to fluid pressure delivered by pumps driven by said driving and driven shafts for controlling the transmission through said hydraulic coupling and the fluid pressure at said pressure device.

7. In apparatus of the class described, the combination with the driving and driven shafts of a power transmission, of a counter-shaft for geared driving connection between said shafts, an hydraulic coupling in said counter-shaft, hydraulically operated means responsive to the speed of the driven shaft for controlling said coupling, coupling members for direct shaft drive connection between said driving and driven shafts, mechanism for shifting said coupling members into and out of engagement, a fluid pressure cylinder having a piston coupled to said mechanism, a fluid pressure control center having valves responsive to a predetermined fluid pressure, pumps driven by said driving and driven shafts for supplying fluid pressure to said control center, and valved ports at said control center responsive to pressures delivered by said pumps to open the fluid pressure to one side of said piston and for reversing the pressure on said piston when the pressures from said pumps are reduced.

8. In apparatus of the class described, the combination with the driving and driven shafts of a power transmission, of a counter-shaft for geared driving connection between said shafts, an hydraulic coupling in said counter-shaft, hydraulically operated means responsive to the speed of the driven shaft for controlling said coupling, coupling members for direct shaft drive connection between said driving and driven shafts, mechanism for shifting said coupling members into and out of engagement, a fluid pressure cylinder having a piston coupled to said mechanism, a fluid pressure control center having valves responsive to a predetermined fluid pressure, pumps driven by said driving and driven shafts delivering fluid pressure through said control center to said cylinder, a piston valve operated by pressure from said pumps when the first named valves respond to the predetermined pressure, and a valve operated by pressure delivered through said piston valve to reverse the pressure on said piston.

9. In apparatus of the class described, the combination with the driving and driven shafts of a power transmission, of a sectional counter-shaft, an hydraulic coupling in said counter-shaft, geared driving connections between said shafts and counter-shaft of constant ratio, a reservoir for supplying liquid to said coupling, means functioning through the speed of the driven shaft for controlling the flow of liquid through said coupling, clutch members for direct shaft drive connection between the driving and driven shafts, shifter mechanism for said clutch, a fluid pressure device for actuating said mechanism, pumps driven by said driving and driven shafts, and a control means responsive to liquid pressure delivered by said pumps from said reservoir for controlling the fluid pressure delivered to said shifter mechanism actuator.

10. In apparatus of the class described, the combination with the driving and driven shafts of a power transmission, of a sectional counter-shaft, an hydraulic coupling in said counter-shaft, geared driving connections between said shafts and counter-shaft of constant ratio, a reservoir for supplying liquid to said coupling, means functioning through the speed of the driven shaft for controlling the flow of liquid through said coupling, clutch members for direct shaft drive connection between the driving and driven shafts, shifter mechanism for said clutch, a fluid pressure cylinder having a piston coupled to said mechanism, a liquid pressure control center having valves responsive to a predetermined pressure delivered by pumps driven by said driving and driven shafts, and valved ports at said control center responsive to balanced pressures delivered by said pumps to open the fluid pressure to one side of said piston and for reversing the pressure on said piston when the pressures from said pumps are reduced.

11. In apparatus of the class described, the combination with the driving and driven shafts of a power transmission, of a counter-shaft for geared driving connection between said shafts, means for varying the transmission by said counter-shaft, coupling members for direct shaft drive connection between said driving and driven shafts, mechanism for shifting said coupling members into and out of engagement, a fluid pressure device for actuating said mechanism, a control means responsive to fluid pressure delivered by pumps driven by said driving and driven shafts for controlling the fluid pressure at said pressure device, a hand lever for manually operating said shifter mechanism, and manually operated pressure relieving means for said fluid pressure device to permit manual operation of said shifter mechanism.

12. In apparatus of the class described, the combination with the driving and driven shafts of a power transmission, of a counter-shaft for geared driving connection between said shafts, means for varying the transmission by said counter-shaft, coupling members for direct shaft drive connection between said driving and driven shafts, mechanism for shifting said coupling members into and out of engagement, a fluid pressure device for actuating said mechanism, a control means responsive to fluid pressure delivered by pumps driven by said driving and driven shafts for controlling the fluid pressure at said pressure device, a hand lever for manually operating said shifter mechanism to shift the transmission into neutral and reverse, manually operated pressure relieving means for said fluid pressure device to permit manual operation of said shifter mechanism for speed change, and means co-operating with said lever for locking said shifter mechanism to maintain the transmission in overdrive.

13. In apparatus of the class described, the combination with the driving and driven shafts of a power transmission, of a sectional counter-shaft, an hydraulic coupling in said countershaft, geared driving connections between said shafts and counter-shaft of constant ratio, a reservoir for supplying liquid to said coupling, means functioning through the speed of the driven shaft for controlling the flow of liquid through said coupling, clutch members for direct shaft drive connection between the driving and driven shafts, shifter mechanism for said clutch, a fluid pressure device for actuating said mechanism, pumps driven by said driving and driven shafts, a control means responsive to liquid pressure delivered by said pumps from said reservoir for controlling the fluid pressure delivered to said shifter mechanism actuator, a hand lever for manually operating said shifter mechanism, and manually operated pressure relieving means for said fluid pressure device to permit manual operation of said shifter mechanism.

14. A power transmission mechanism having in combination a driving shaft, a driven shaft, hydraulic transmission means between said shafts, manual control means for starting the functioning of said hydraulic transmission, and hydraulically actuated means responding to the speed of the driven shaft for automatically varying said hydraulic transmission.

15. A power transmission mechanism having in combination a driving shaft, a driven shaft, hydraulic transmission means between said shafts, manual control means for starting the functioning of said hydraulic transmission, control means for automatically varying transmission, and means functioning through the relative speeds of the driving and driven shafts for varying the transmission to increase or decrease the speed of the driven shaft.

16. A power transmission having in combination a driving shaft, a driven shaft, a direct shaft drive coupling between said shafts, hydraulically operated means for shifting said coupling, an hydraulic coupling between said shafts for variable speed drive, hydraulically operated means for varying the drive through said hydraulic coupling, and pumps responsive to the speeds of the driving and driven shafts for varying the pressures at said several hydraulically operated means.

17. In apparatus of the class described, the combination with the driving and driven shafts of a power transmission, of a sectional counter-shaft, an hydraulic coupling in the counter-shaft, driving connections between said shafts and counter-shaft of constant ratio for overdrive of the driven shaft through said coupling, means for varying the transmission through said hydraulic coupling, and means for maintaining the transmission at overdrive through said hydraulic coupling.

18. In apparatus of the class described, the combination with the driving and driven shafts of a power transmission, of a sectional counter-shaft, an hydraulic coupling in the counter-shaft, driving connections between said shafts and counter-shaft of constant ratio for overdrive of the driven shaft through said coupling, hydraulically actuated means for automatically varying the transmission through said hydraulic coupling, and means for maintaining the transmission at overdrive through said hydraulic coupling.

19. In apparatus of the class described, the combination with the driving and driven shafts of a power transmission, of a sectional counter-shaft, an hydraulic coupling in the counter-shaft, driving connections between said shafts and counter-shaft of constant ratio for overdrive of the driven shaft through said coupling, hydraulically actuated means responding to the speed of the driven shaft for automatically varying the transmission through said hydraulic coupling, and means for maintaining the transmission at overdrive through said hydraulic coupling.

20. In apparatus of the class described, the combination with the driving and driven shafts of a power transmission, of a direct shaft drive clutch between said shafts, a sectional counter-shaft, an hydraulic coupling in the counter-shaft, step-up gear drive connections of constant ratio between the counter-shaft and driving and driven shafts for overdrive, shifter means for changing the drive from geared to direct shaft drive and vice versa, hydraulic means for actuating said shifter means, and means for varying the transmission through said hydraulic coupling.

21. In apparatus of the class described, the combination with the driving and driven shafts of a power transmission, of a direct shaft drive clutch between said shafts, a sectional counter-shaft, an hydraulic coupling in the counter-shaft, step-up gear drive connections of constant ratio between the counter-shaft and driving and driven shafts for overdrive, shifter means for changing the drive from geared to direct shaft drive and vice versa, hydraulic means for actuating said shifter means, means for varying the transmission through said hydraulic coupling, and means for maintaining the transmission at overdrive through said hydraulic coupling.

22. In apparatus of the class described, the combination with the driving and driven shafts of a power transmission, of a direct shaft drive clutch between said shafts, manually actuated means for operating said clutch at will, a sectional counter-shaft, an hydraulic coupling in the counter-shaft, driving connections between said shafts and counter-shaft of constant ratio for overdrive of the driven shaft through said coupling, means for varying the transmission through said hydraulic coupling, and means cooperating with said manually actuated clutch operating means for maintaining the transmission at overdrive through said hydraulic coupling.

GEORGE STROBRIDGE.